United States Patent [19]
Koop

[11] 3,861,459
[45] Jan. 21, 1975

[54] METHOD OF AND APPARATUS FOR HEATING, VENTILATING AND AIR-CONDITIONING UTILIZING HEAT RECOVERY

[76] Inventor: Frederick W. Koop, 5 Meadowbrook Dr., Lakewood, N.J. 08701

[22] Filed: Jan. 16, 1973

[21] Appl. No.: 324,097

[52] U.S. Cl. .............................................. 165/62
[51] Int. Cl. ........................................... F25b 13/00
[58] Field of Search ............ 165/50, 22, 29, 59, 60, 165/62, 7

[56] References Cited
UNITED STATES PATENTS

| | | |
|---|---|---|
| 2,668,426 | 2/1954 | Hammell................................ 165/29 |
| 2,919,558 | 1/1960 | Lauer..................................... 165/29 |
| 3,009,540 | 11/1961 | Munters.................................. 165/7 |

*Primary Examiner*—Charles Sukalo
*Attorney, Agent, or Firm*—Bain, Gilfillan & Rhodes

[57] ABSTRACT

Method of and apparatus for heating, ventilating and air-conditioning are disclosed in terms of a system designed to incorporate a heat recovery device for achieving heat transfer between exhaust air and outside intake air. The transferred heat is carried by the outside air to a cooling coil for transfer to a cooling medium for subsequent transfer to a heat rejection system utilizing condenser water. Heat transferred to the condenser water is used to heat spaces being conditioned and also, selectively, to heat water in a domestic hot water system.

10 Claims, 2 Drawing Figures

3,861,459

METHOD OF AND APPARATUS FOR HEATING, VENTILATING AND AIR-CONDITIONING UTILIZING HEAT RECOVERY

BACKGROUND OF THE INVENTION

This invention relates to the field of heating, ventilating and air-conditioning systems. In particular, this invention is directed to heating, ventilating and air-conditioning systems wherein a condenser water system is utilized to provide heat to heat pumps to be used to heat conditioned spaces in a winter system cycle.

The loss of heat with exhaust air during a winter heating cycle of a heating, ventilating and air-conditioning system has long been a concern of heating and ventilating engineers. Various systems and methods for recovering the otherwise lost heat have been proposed. Some have been more successful than others. Each has had its disadvantages.

The present invention relates to a system for recovering heat which otherwise would be lost to the outside and using this heat either for heating spaces to be conditioned or for heating domestic hot water in a hot water system, or both.

SUMMARY OF THE INVENTION

It is an object of the present invention, therefore, to provide a method of and apparatus for heating, ventilating and air-conditioning wherein the heat rejection to the outside is minimized as desired.

Another object of the present invention is to provide a method of and apparatus for heating, ventilating and air conditioning wherein heat is retained within the system rather than lost to the outside and used to heat spaces to be conditioned during the winter heating cycle of the system.

Still another object of the present invention is to provide a method of and apparatus for heating, ventilating and air-conditioning which utilizes heat otherwise discharged to the outside for the purpose of heating the water of a domestic hot water heating system.

Yet another object of the present invention is to improve the ecological heat balance by avoiding unnecessary heat discharge into the atmosphere.

These and other objects not enumerated are achieved by the heating, ventilating and air-conditioning system of the present invention, one embodiment of which may include an air circulation system having a return air path, an exhaust air path, an outside air intake path, a unit air path and a supply air path; a cooling medium system including refrigeration means, a cooling coil disposed in said air circulation system to cool air from said unit air path to provide cool air to said supply air path, a cooling medium line for carrying cooling medium from said refrigeration means to said cooling coil for circulation therethrough, and a cooling medium return line for carrying cooling medium from said cooling coil to said refrigeration means; a heat rejection system including a heat pump means disposed in a space being conditioned, a condenser water circulation system, said condenser water circulation system for carrying condenser water from a condenser discharge side of said refrigeration means to the inlet side of said heat pump means and from the discharge side of said heat pump means to the condenser inlet of said refrigeration means; and heat recovery means for recovering heat from air passing in said exhaust air path and transferring said heat to outside air passing through said outside air intake path, said recovered heat being transferred by said outside air to said cooling coil for transfer to said cooling medium and thereafter by said cooling medium to said refrigeration means for transfer to said condenser water, said recovered heat in said condenser water for transfer to said space being conditioned through said heat pump.

A method of heating, ventilating and air-conditioning according to the present invention may include the steps of recovering heat from a body of flowing exhaust air; transferring the recovered heat to a body of outside air; transferring the recovered heat from the body of outside air to a cooling medium of a refrigeration system; transferring the recovered heat from the cooling medium to a condenser fluid medium; and thereafter passing the condenser fluid medium carrying the recovered heat through at least one heat pump for supporting a heating load.

BRIEF DESCRIPTION OF THE DRAWINGS

A more complete understanding of the method and apparatus of the present invention may be had from the following detailed description thereof, particularly when read in the light of the accompanying drawings wherein.

DETAILED DESCRIPTION

Figure 1:
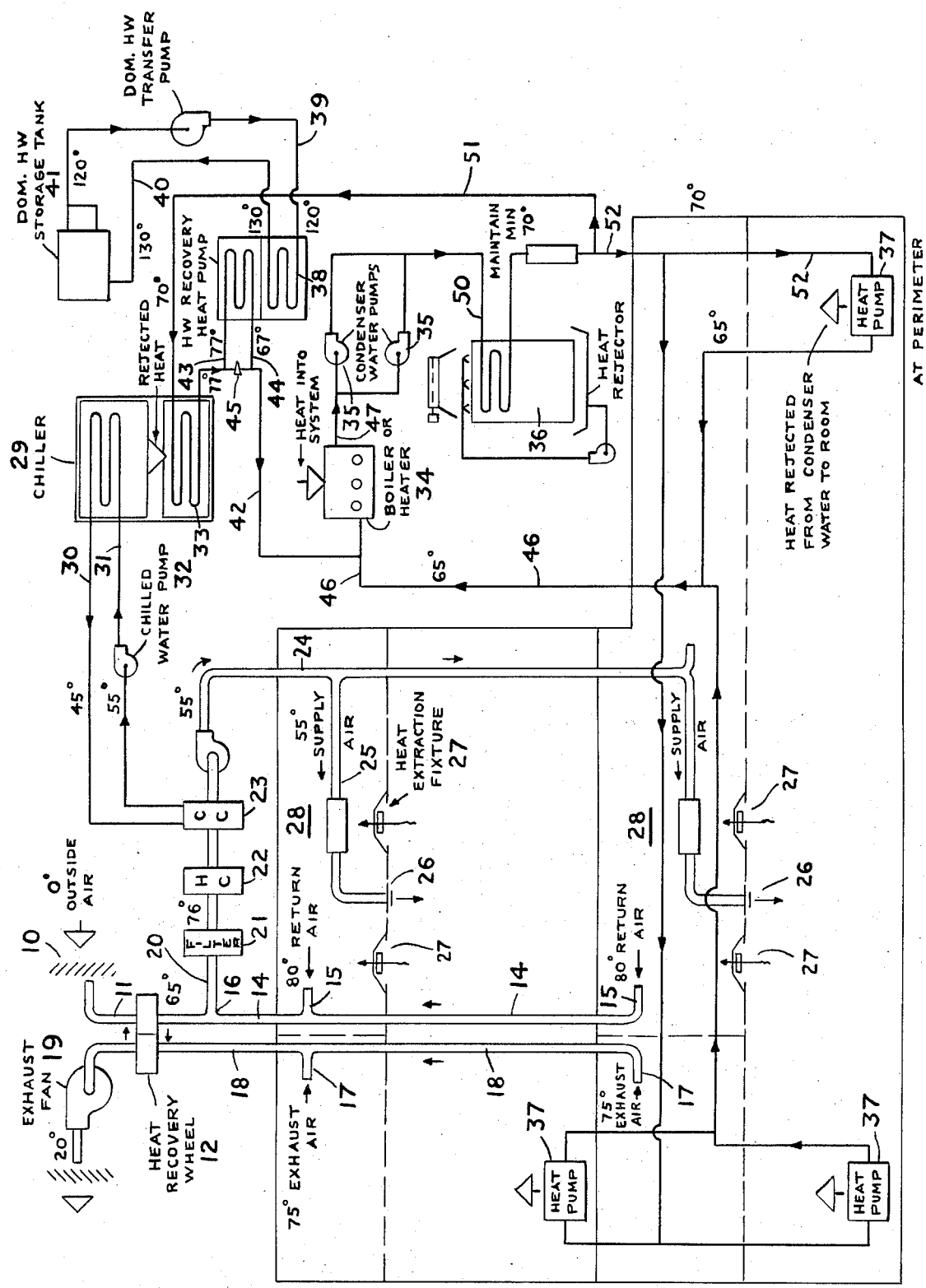
FIG. 1 is a block diagram of a heating, ventilating and air-conditioning system structured in accordance with the teachings of the present invention and showing the system in operation for a winter heating cycle.

Considering the heating, ventilating and air-conditioning system of the present invention in detail, and with particular reference to FIG. 1, those having ordinary skill in these arts will easily recognize the system components to include an air circulation system having a return air path, an exhaust air path, an outside air intake path, a unit air path and a supply air path, each of which is discussed below in detail. Cooling of air passing through the unit air path is achieved by a cooling medium system heat from which is withdrawn by a heat rejection system, all of which also are discussed below in detail. The heat rejection system of the inventive apparatus withdraws heat from the cooling medium system, supplementing the heat as required by a heat generating apparatus and discharges the heat to either or both of a domestic hot water system or a space heating system such as the peripheral unit heat pump system shown. As is discussed in more detail with respect to summer operation of the system, the condenser system also includes a heat rejector such as a cooling tower for discharge of excess heat to the atmosphere.

The air circulation system of the present invention includes an outside air inlet 10 which permits the entry of outside air into an outside air path 11 which may be defined by a suitable plenum or ductwork of the type known in the art. Air from the outside air path is thereafter passed through a heat recovery device 12 which may be a heat recovery wheel or any of the other known such heat transfer devices.

Air discharging from heat recovery device 12 is mixed with return air from a return air path 14. Return air path 14 can be seen to comprise return air openings 15 which permit the exiting of air from over-ceiling plenums in conditioned spaces and the transport of the return air through suitable ductwork at the point 16 where it is mixed with the outside air which has passed through heat recovery device 12.

In the system shown in FIG. 1 a distinction is shown between the handling of return air and exhaust air. As shown, return air is drawn from over-ceiling plenums whereas exhaust air is drawn directly from spaces to be exhausted through exhaust openings 17 and thereafter transported along exhaust air path 18 ductwork to be passed through heat recovery device 12 whereafter it is exhausted from the structure by exhaust fan 19. It will be recognized by those skilled in these arts, however, that air handling systems may be structured wherein air withdrawn from all spaces except lavatory and like facilities is returned within a common ductwork system and subsequently divided into a desired return air-exhaust air volumetric relationship.

In the present invention, however, return air is mixed with outside air which has been preheated by heat recovery device 12. The mixed air is then passed through a unit air path 20 which path may include passage of the air through a suitable filter 21, a heating coil 22 and a cooling coil 23.

Air discharging from the cooling coil end of unit air path 20 is transmitted as supply air through a supply air path 24 which includes supply air distribution ductwork 25 and one or more supply air diffusers 26. Conditioned air is delivered to spaces to be conditioned through air diffusers 26, where, after conditioning the spaces the air is returned to the system by being passed through heat extraction fixtures 27 into over-ceiling plenums 28. From over-ceiling plenums 28 the air is returned to the system through return air path 14 or otherwise as is generally known in the art.

The specific structure of any of the above-identified components forms no part of the present invention and each component may be selected from any of the many known generally to those skilled in these arts.

A cooling medium for cooling coil 23 is provided by the operation of a cooling medium system which includes cooling coil 23, a refrigeration means 29, a cooling medium supply line 30 and a cooling medium return line 31. As will be recognized by those skilled in these arts the cooling medium system may be a refrigerant system or a chilled water system as is shown. Thus, a chilled water system such as that shown will also include a chilled water pump 32 located in a suitable location such as in return line 31, which pump generates a flow of chilled water through the cooling medium system.

Heat withdrawn from the cooling medium system is passed into a heat rejection system the heat carrying medium being condenser water. The heat rejection system includes the condenser heat exchanger 33 of refrigeration means 29, a heat generator such as boiler 34, condenser water pumps 35, a summer cycle heat rejector such as cooling tower 36 and one or more heat pumps 37 located selectively in spaces to be conditioned. The various components of the system are in fluid communication through condenser water supply, condenser water return and by-pass lines as is discussed below in detail.

Figure 2:
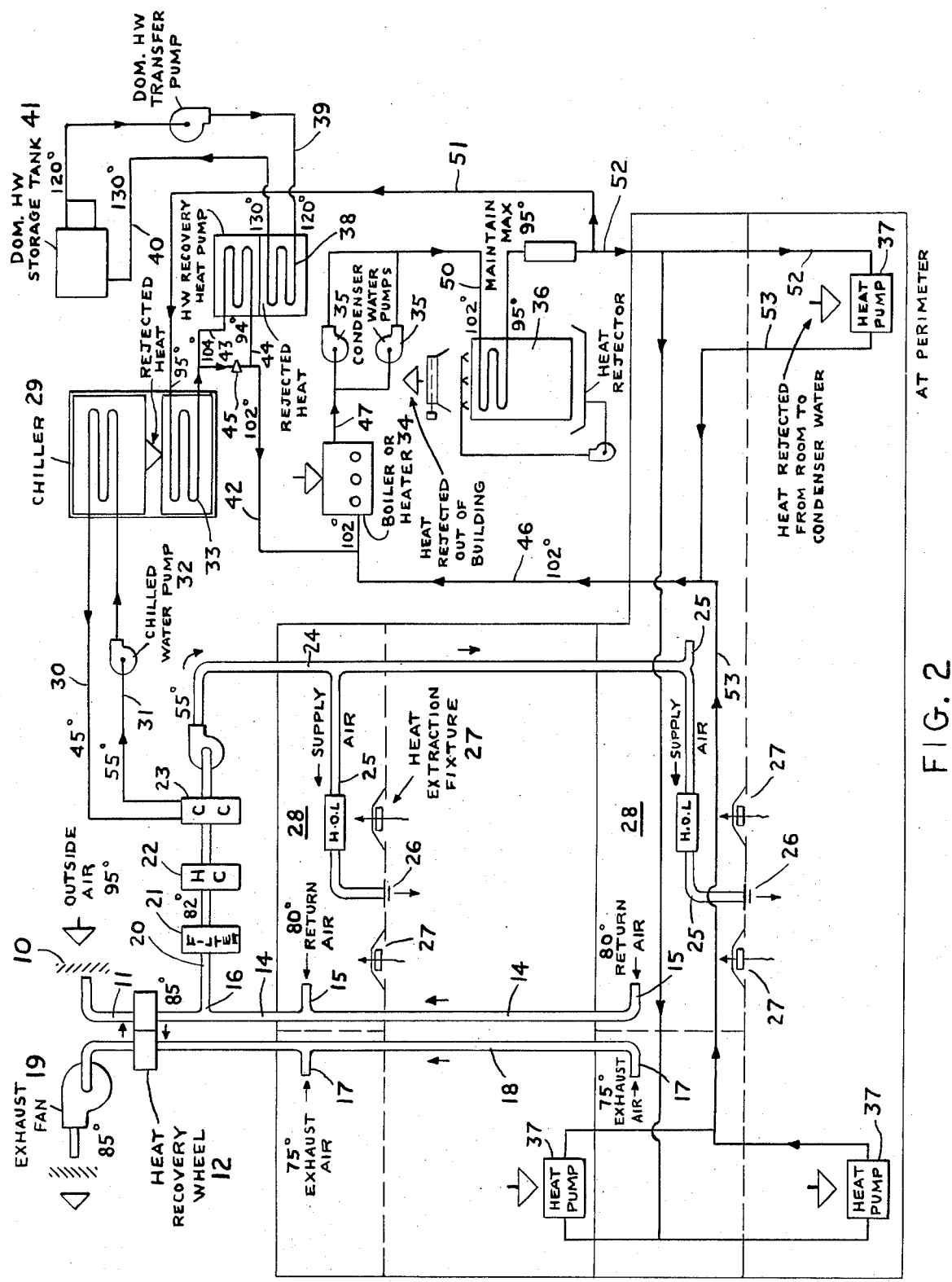
FIG. 2 is a block diagram similar to the diagram of FIG. 1 but showing the system in operation for a summer cooling cycle.

In one embodiment of the present invention the heat rejection system may also include a hot water recovery heat pump 38 wherein condenser water is utilized as a heat source medium and domestic hot water is utilized as the condenser or heated medium. In this embodiment water to be used as domestic hot water is circulated from the domestic hot water system of the structure being served and heated to a desired temperature by the action of heat pump 38. As best can be seen in FIGS. 1 and 2, water is pumped through a hot water supply line 39 to heat pump 38 where it is heated. Thereafter the heated water is returned to a domestic hot water storage tank 41 through a hot water return line 40.

Considering now the flow of condenser water through the heat rejection system commencing at the discharge of condenser heat exchanger 33 of refrigeration means 29, condenser water flows through a condenser water return line 42. Tapped into return line 42 are inlet and discharge lines 43 and 44 respectively which place hot water recovery heat pump 38 in parallel flow position with return line 42. A flow balancing valve 45 is provided in return line 42 between the upstream tap of inlet line 43 and discharge line 44. Balancing valve 45 equalizes resistance to the flow of condenser water through hot water recovery heat pump 38 and the heat pump by-pass line in which valve 45 is located. The use of valve 45 permits heat pump 38 to operate at a lower flow rate than the full flow rate of the condenser water system thus achieving obvious economics.

Condenser water return line 42 joins with a condenser water return line 46 which returns condenser water from heat pumps 37 which are providing perimeter heat to the spaces being conditioned. Condenser water returned from refrigeration means 29 and the perimeter heat pumps 37 is passed through a heat generating device such as boiler 34. Boiler 34 is operated to add heat to the condenser water upon the occurrence of an inability of heat picked up at the refrigeration means 29 to handle the heating requirements of the system including, in the embodiment shown, both domestic hot water and perimeter heating.

Water discharging from boiler 34 passes through a condenser water supply line 47 to a pumping station having a pair of condenser water pumps 35 aligned in parallel. The first and second condenser water pumps are sized such that each can pump the full load flow of condenser water thereby, as is well known, permitting one pump to be on-line while the other pump is acting as a standby.

Water discharging from the condenser water pumping station passes through condenser water line 50 to a heat rejector such as cooling tower 36. As will be recognized by those skilled in these arts cooling tower 36 is utilized only in the cooling cycle and thus, although not shown, the condenser water may be piped to completely by-pass the cooling tower 36 during the heating cycle.

Condenser water discharging from cooling tower 36 flows through condenser water supply line 51 to the inlet side of the condenser heat exchanger 33 where it picks up heat in the operation of the apparatus. Condenser water from the cooling tower also flows through condenser water supply line 52 whereby it is carried to the inlet connections of each heat pump 37. As will be recognized by those skilled in these arts, heat carried by the condenser water into heat pumps 37 is extracted from the condenser water by the operation of the heat pumps and used to heat the space being conditioned.

The used condenser water is returned from heat pumps 37 to main condenser water return line 46 through condenser water return lines 53.

It will be recognized by those skilled in these arts that the equipment sizes, fluid flows, temperature control relationships and other technical specifications and data will be dictated, in each case, by the size of the space being conditioned, the structure of the space-defining building, the use to which the space is being put, the occupancy and many other design criteria which are known to those skilled in these arts. Such equipment selection, sizing or choice of design data are not critical to the practice of the present invention and are well within ordinary skill. Further the method of constructing the heating, ventilating and air-conditioning system according to the invention can be any of the generally accepted construction methods presently utilized in this art.

Although the operation of the heating, ventilating and air-conditioning system according to the present invention is well within the capabilities of those having ordinary skills in these arts, it is considered to be useful to a more complete understanding of the present invention to describe the operation of the system, both during heating and cooling cycles, in terms of the respective fluid temperatures. Such an explanation represents operating temperatures which are experienced during the best mode of operation presently known to the inventor. It should be recognized, however, that maintenance of the disclosed temperatures is not critical to the practice of the invention and they, as design criteria, may be departed from without departing from the present teaching.

Thus, considering FIG. 1 and the winter cycle disclosed therein, the design conditions chosen are an indoor temperature of 75°F upon the occurrence of 0°F outside air temperature. Air from conditioned spaces is exhausted at the room temperature of 75°F and air from above ceilings is returned at 80°F, the temperature differential representing heat picked up from the operation of lights which are shown to be heat extraction fixtures 27.

Exhaust air is passed through heat recovery wheel 12 and sufficient heat is extracted and transferred to incoming outside air to lower the exhaust air temperature to 20°F and raise the incoming outside air temperature to 65°F. The outside air is thereafter combined with return air to provide an air mixture entering the unit air path at a temperature of 76°F.

Supply air discharging from the unit at 55°F is utilized, as is generally known, to cool those spaces and handle loads such as interior rooms equipment and the like where year round cooling is desired. The supply air picks up its heat in the space and is either exhausted or returned as appropriate with the air cycle thereafter being repeated.

As noted above, cooling coil 23 reduces the temperature of air passing therethrough from 76°F to 55°F. The heat removed from the air at this point is carried away by a cooling medium, either refrigerant, chilled water or otherwise, the cooling medium in this case being chilled water supplied at 45°F and being raised in temperature across the coil to 55°F.

Heat carried from the cooling coil by the cooling medium is removed therefrom in refrigeration means 29 and transferred to condenser water in the condenser water heat exchanger raising the temperature of the condenser water from 70°F to 77°F. In one embodiment of the invention, high temperature condenser water is passed through the hot water recovery heat pump 38 to raise domestic hot water from 120°F to 130°F and thereby lowering the condenser water temperature to 67°F. In such a case, the 67°F condenser water is mixed with condenser water returning at 65°F from a peripheral heating system and passed through boiler 34 to raise its temperature to 70°F, the arbitrary design minimum established for condenser water supply. The 70°F condenser water supply is then carried to both the refrigeration means 29 as well as the heat pumps 37 of a peripheral heating system wherefrom it is discharged at 65°F.

The operation of the heating, ventilating and air-conditioning system according to the present invention, therefore, minimizes the amount of heat discharged to the atmosphere and by transferring the recovered heat to the condenser water system utilizes the recovered heat to accomplish both domestic hot water and peripheral heating.

In operation of the system for summer cooling, and with particular reference to FIG. 2, the design conditions chosen are an indoor temperature of 75°F upon the occurrence of 95°F outside air temperature. Air from conditioned spaces is exhausted at the room temperature of 75°F and air from above ceilings is returned to 80°F, the temperature differential representing heat picked up from heat extraction fixtures 27 as discussed above.

Exhaust air is passed through heat recovery wheel 12 and sufficient heat is extracted from the incoming outside air to lower the outside air supply temperatures to 85°F while raising the exhaust air temperature to 85°F. The outside air is thereafter combined with return air to provide an air mixture entering the unit air path at a temperature of 82°F.

The unit air is cooled by cooling coil 23 to discharge at 55°F. Heat removed from the air at the unit is carried away by the cooling medium which enters cooling coil 23 at 45°F and is discharged at 55°F.

Heat removed from the air flow at cooling coil 23 is carried to refrigeration means 29 and transferred to condenser water in the condenser water heat exchanger 33, raising the condenser water temperature from 92°F to 104°F. As was noted above, one embodiment of the invention provides that thereafter the condenser water is used to heat domestic hot water by being passed through hot water recovery heat pump 38 wherein the temperature of the condenser water is reduced from 104°F to 94°F.

As noted above, economics are achieved by passing less than full condenser water flow through hot water recovery heat pump 38, thus a portion of the condenser water is by-passed around heat pump 38 by flow control 45. The utilized and by-passed condenser water are thereafter remixed to provide a condenser water return temperature of 102°F which corresponds in temperature to the condenser water return from space heat pumps 37.

The condenser water is then passed through or around inactive boiler 34, propelled by condenser water pumps 48 and/or 49 and passed into cooling tower 36 where the temperature is reduced from 102°F to 92°F. The 92°F condenser water is transmitted to refrigeration means 39 and space heat pumps 37 such as to achieve the desired air conditioning.

It can be seen, therefore, that the heating, ventilating and air-conditioning system according to the invention maximizes efficiency by utilizing heat which otherwise would be discharged to the atmosphere. In winter cycle the system recovers heat from exhaust air and transfers it to condenser water so as to heat domestic hot water and peripheral spaces to be conditioned. In summer cycle the system diverts heat, which otherwise would be rejected by the cooling tower, for use in heating domestic hot water. As is recognized in the art conventional heating, ventilating and air-conditioning systems operate using 20 to 40 percent fresh air intake. In such known systems the use of a heat recovery wheel is not justafiable because of the known economizer cycle which discharges heated exhaust air to atmosphere while attempting to maintain a 55°F supply air temperature notwithstanding a concurrent need for perimeter heating. The present invention precludes this anomoly by recovering heat from the exhaust air in amounts limited only by the efficiency of the heat recovery wheel without regard for supply air temperature or the volume of fresh air intake.

Those skilled in this art will recognize readily the advantages of the system and their improvement vis-a-vis the state of the art. It is manifest, however, that many modifications and variations to the disclosed embodiment may be made without departing from the spirit of the invention.

What is claimed is:

1. A heating, ventilating and air-conditioning system comprising:

an air circulation system having a return air ductwork system defining a path for return air passage from a space to be conditioned, an exhaust air ductwork system defining a path for exhaust air passage from said return air system to the outside, an outside air ductwork system defining a path for passage of outside air from the outside to said return air ductwork system, a supply air ductwork system defining a path for supply air passage from a unit to a space to be conditioned, and a unit ductwork system for defining a passage for air through an air handling unit and extending between said return air ductwork system and said supply air ductwork system;

a cooling medium system including refrigeration means, a cooling coil disposed within said unit ductwork of said air circulation system so as to cool air circulating within said unit ductwork to be supplied to said supply air ductwork system, a cooling medium supply line for carrying a cooling medium from said refrigeration means to said cooling coil for circulation therethrough, and a cooling medium return line for carrying cooling medium from said cooling coil to said refrigeration means, said refrigeration means including a heat exchanger having a cooling medium path from inlet and outlet and a condenser water path from inlet to outlet;

a heat rejection system including a heat pump means disposed in said space to be conditioned, a condenser water circulation system, said condenser water circulation system for carrying condenser water from the condenser water outlet of said refrigeration means to the inlet side of said heat pump means and from the discharge side of said heat pump means to the condenser water inlet of said refrigeration means; and heat recovery means disposed to extend into said exhaust air passage and said outside air passage such as to recover heat from air passing in said exhaust air passage and to transfer said recovered heat to outside air passing within said outside air passage, said recovered heat being transferred by said outside air to said cooling coil for transfer to said cooling medium and thereafter by said cooling medium to said refrigeration means for transfer to said condenser water, said recovered heat in said condenser water for transfer to said space being conditioned through said heat pump.

2. A heating, ventilating and air-conditioning system according to claim 1 wherein said heat recovery means is a heat recovery wheel.

3. A heating, ventilating and air-conditioning system according to claim 1 including a heat generating means disposed in said heat rejection system, said heat generating means for adding heat to said condenser water in response to the heating requirements of said space being conditioned.

4. A heating, ventilating and air-conditioning system according to claim 1 wherein said cooling medium system is a refrigerated chilled water system, heat removed from circulated chilled water being transferred to the condenser water of said heat rejection system.

5. A heating, ventilating and air-conditioning system according to claim 1 and including a heat recovery pump for heating domestic hot water in a hot water system, said heat recovery pump being connected to said condenser water circulation system such as to utilize condenser water flowing therethrough as a source medium of heat, and said heat recovery pump being connected to said domestic hot water system.

6. A heating, ventilating and air-conditioning system according to claim 5 wherein said heat recovery means is a heat recovery wheel.

7. A heating, ventilating and air-conditioning system according to claim 5 including a heat generating means disposed in said heat rejection system, said heat generating means for adding heat to said condenser water in response to heat requirements of said space being conditioned and said domestic hot water system.

8. A heating, ventilating and air-conditioning system according to claim 5 wherein said cooling medium system is a refrigerated chilled water system, heat removed from circulated chilled water being transferred to the condenser water of said heat rejection system.

9. In combination with a heating, ventilating and air-conditioning system utilizing an air circulation system having a return air ductwork system defining a path for return air passage from a room to be conditioned to an air handling unit, an exhaust air ductwork system a path for exhaust air from said return air ductwork system to the outside, an outside air ductwork system defining a path for outside air passage from the outside to said return air ductwork system, a unit ductwork system for defining a passage of air through an air handling unit from said return air ductwork system to a supply air ductwork system defining a path for supplying air from said air handling unit to a space to be conditioned; a cooling medium system including a refrigeration means, a cooling coil disposed within said unit ductwork of said air circulation system so as to cool air recirculating within said unit ductwork to be supplied to said supply air ductwork system, a cooling medium supply line for carrying a cooling medium from said refrigeration means to said cooling coil for circulation therethrough, and a cooling medium return line for carrying cooling medium from said cooling coil to said refrigeration means, said refrigeration means including a heat exchanger having a cooling medium path from inlet to outlet and a condenser water path from inlet to outlet; and a heat rejection system including a heat pump means disposed in a space to be conditioned, a condenser water circulation system, said condenser water circulation system for carrying condenser water from the condenser water outlet of said refrigeration means to the inlet side of said heat pump means and from the discharge side of said heat pump means to the condenser water inlet of said refrigeration means;

a heat recovery means for heating domestic hot water in a hot water system, said heat recovery means disposed to extend into said exhaust air passage and said outside air passage such as to recover heat from air passing in said exhaust air passage and to transfer said recovered heat to outside air passing within said outside air passage, said recovered heat being transferred by said outside air to said cooling coil for transfer to said cooling medium and thereafter by said cooling medium to said refrigeration means for transfer to aid condenser water, said recovered heat and said condenser water for transfer to domestic hot water in a domestic hot water system whereby to utilize condenser water flowing therethrough as a source medium of heat.

10. The combination of claim 9 including a heat generating means disposed in said condenser water system, said heat generating means for adding heat to said condenser water in response to heat requirements of said being conditioned and said domestic hot water system.

* * * * *